US009693356B1

(12) United States Patent
Ren et al.

(10) Patent No.: US 9,693,356 B1
(45) Date of Patent: Jun. 27, 2017

(54) SMART ON-DEMAND INTERNET-OF-THINGS CONNECTIONS

(71) Applicant: Verizon Patent and Licensing Inc., Arlington, VA (US)

(72) Inventors: Dahai Ren, Lincoln, MA (US); Jianxiu Hao, Acton, MA (US); Ming Chen, Bedford, MA (US); Zhong Chen, Acton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 15/148,350

(22) Filed: May 6, 2016

(51) Int. Cl.
*H04W 72/04* (2009.01)
*H04W 4/00* (2009.01)
*H04W 60/02* (2009.01)
*H04L 29/08* (2006.01)
*H04W 72/12* (2009.01)
*H04W 24/08* (2009.01)
*H04W 84/12* (2009.01)

(52) U.S. Cl.
CPC ......... *H04W 72/0486* (2013.01); *H04L 67/12* (2013.01); *H04W 4/005* (2013.01); *H04W 24/08* (2013.01); *H04W 60/02* (2013.01); *H04W 72/1226* (2013.01); *H04W 84/12* (2013.01)

(58) Field of Classification Search
None
See application file for complete search history.

(56) References Cited

U.S. PATENT DOCUMENTS

| 8,498,639 | B2 * | 7/2013 | Chen | H04L 1/0026 370/252 |
| 8,984,576 | B2 * | 3/2015 | Sze | H04L 47/38 370/338 |
| 2015/0156659 | A1 * | 6/2015 | Sze | H04N 21/6143 370/338 |
| 2016/0099963 | A1 * | 4/2016 | Mahaffey | H04L 63/1433 726/25 |

* cited by examiner

Primary Examiner — Diane Mizrahi (57) ABSTRACT

A method is performed in a service provider network. The method includes a network device receiving registration records for multiple machine-type communication (MTC) devices, each of the registration records including a connection profile that indicates a level of delay tolerance for connections. The method also includes receiving, by a fixed-location accepter device and via wireless signals, connection requests from the multiple MTC devices, wherein each of the connection requests includes a connection profile indicator. The method further includes the network device receiving an indication of inadequate capacity to accept all the connection requests from the multiple MTC devices; and directing, in response to receiving the indication, a mobile accepter device into a geographic area wherein the mobile accepter device is configured to accept at least a portion of the connection requests, via wireless signals, the portion of the connection requests including connection profile indicators that indicate a tolerance for delay.

20 Claims, 10 Drawing Sheets

SMART ON-DEMAND INTERNET-OF-THINGS CONNECTIONS

BACKGROUND

Internet of Things (IoT) technology refers to a wide range of devices that can collect and forward data. The IoT devices may be configured to transfer the data via a cellular network. Since IoT technology has nearly limitless applications that can be leveraged to form new and useful services, interest among service providers and developers in IoT technology continues to increase. Supporting the growing number of connection requests and volume of data from IoT technology presents a significant challenge for providers of network services.

DETAILED DESCRIPTION OF THE PREFERRED EMBODIMENTS

The following detailed description refers to the accompanying drawings. The same reference numbers in different drawings may identify the same or similar elements.

The IoT may be described as a network of physical objects or "things" embedded with various types of electronics, software, sensors, logic, circuitry, etc., that can collect and exchange data. A "thing" (referred to herein as an "IoT device" or, alternatively, a "machine-type communication (MTC) device") may connect to a service hosted on the Internet indirectly (e.g., via another network device (e.g., a coordinator, a gateway, etc.)) or directly. With the number of IoT devices projected to grow in magnitude from millions to billions within the next several years, IoT devices will create increasing demands for network capacity.

Typically, base stations or wireless towers are primary terminals that accept initial connection requests from IoT devices and further route them to the next component in the network. Many IoT devices are low-power devices that cannot communicate with wireless towers directly. According to implementations described herein, more powerful middle devices (referred to herein as "accepters" or "accepter devices") are used to bridge the low-power IoT devices to the wireless towers. Accepters may be deployed as fixed units or mobile units.

IoT devices collectively send a very large volume of connection requests to the network. However, the payload associated with each request is typically small. For a service provider (e.g., of wireless network services), it is a challenge to guarantee that all requests can be satisfied in real time. Furthermore, not all IoT devices are associated with services that require real-time communications. Thus, according to implementations described herein, connections for IoT devices may be categorized into different customer-selected profiles that indicate the urgency of connection requests from the respective device.

A network infrastructure that supports real-time communications for every connection request from an IoT device could result in excessive capacity with largely wasted resources during non-peak use periods. Conversely, complex real-time planning may be required to enable limited network resources to adequately support a combination of real-time IoT communications and delay-tolerant IoT communications. According to implementations described herein, a smart on-demand scheduler allows a service provider to fully utilize its network capacity while satisfying the needs of all IoT customers.

According to an implementation, a method is performed in a service provider network. The method may include a network device receiving registration records for multiple MTC devices, each of the registration records including a connection profile that indicates a level of delay tolerance for connections. The method may also include receiving, by a fixed-location accepter device and via local wireless signals, connection requests from the multiple MTC devices, wherein each of the connection requests includes a connection profile indicator. The method may further include the network device receiving an indication of inadequate capacity to accept the connection requests from the multiple MTC devices and the network device directing, in response to receiving the indication, a mobile accepter device into a geographic area where the mobile accepter device accepts at least a portion of the connection requests, via the local wireless signals, the portion of the connection requests including connection profile indicators that indicate a tolerance for delay.

Figure 1:
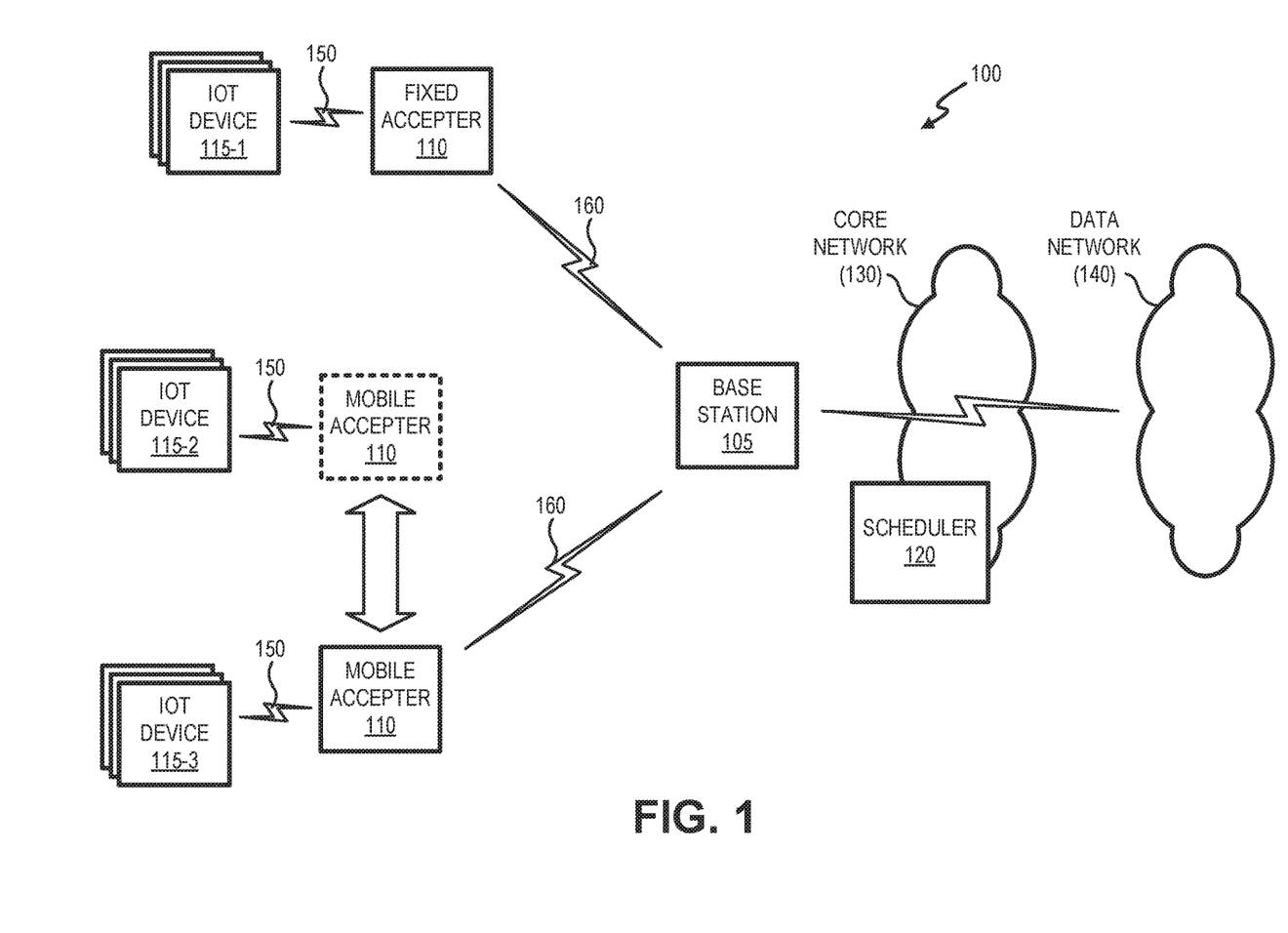
FIG. 1 is a diagram that depicts an exemplary network environment in which systems and methods described herein may be implemented.

FIG. 1 is a diagram that depicts an exemplary network environment 100 in which systems and methods described herein may be implemented. As shown in FIG. 1, network environment 100 may include a base station 105; accepters 110; class A IoT devices 115-1, class B IoT devices 115-2, and class C IoT devices 115-3 (referred to collectively as IoT devices 115); a scheduler 120; a core network 130; and a data network 140 connecting IoT devices 115 to data network 130. Although not shown, network environment 100 may include additional devices, such as gateways, and additional networks. Devices/networks of environment 100 may be interconnected via wired and/or wireless connections.

Base station 105 may include one or more devices that receive, process, and/or transmit traffic, such as voice, video, text, and/or other data, destined for and/or originating from mobile user devices (e.g., smart phones, hot spots, gaming devices, computers, cellular devices, etc.) and fixed user devices. Generally, base station 105 can simultaneously support communication with multiple wireless devices, including multiple accepters 110 and/or IoT devices 115. According to implementations described herein, base station 105 may receive data from IoT devices 115 via accepters 110 using an air interface (e.g., a cellular interface) for cellular network signals 160. In some other instances, base station 105 may send traffic directly to and/or receive traffic directly from IoT devices 115 via the air interface. In one implementation, base station 105 may be part of a radio access network (RAN) to enable cellular broadband communication, such as Evolved Universal Mobile Telecommunications System (UMTS) Terrestrial Radio Access Network (E-UTRAN).

Accepter 110 may include a device to bridge signals from IoT devices 115 to base station 105. Accepter 110 may be equipped with multiple signal receivers that accept local wireless signals 150 from registered IoT devices 115 located in the field. Local wireless signals 150 may include, for example, relatively short range signals defined by IEEE 802.11x (Wi-Fi) or IEEE 802.15 (Bluetooth) standards. Accepter 110 may be capable of emitting cellular network signals 160 to a nearby wireless tower (e.g., base station 105). Cellular network signals 160 may include, for example, longer-range signals for wireless standards under the 3rd Generation Partnership Project (3GPP) (e.g., a 3G, 4G, or another cellular broadband-type network).

Accepters 110 may be deployed as fixed-location devices or mobile devices. In one implementation, accepter 110 (e.g., fixed accepter 110) can be deployed at a fixed location, such as located within a box on a telephone pole. In another implementation, acceptor 110 (e.g., mobile accepter 110) can be deployed as a mobile object, such as a device included with a moving vehicle or drone. For example, a mobile accepter 110 may be included on a service vehicle associated with a service provider, a contracted vehicle/driver, or a vehicle routinely associated with a particular geographic area (e.g., package delivery vehicles, etc.) In still another implementation, accepter 110 may periodically emit signals (e.g., using local wireless signals 150) to wake up IoT devices 115 in local signal range and further collect signals/information from those IoT devices 115.

IoT device 115 includes logic that collects, obtains, and/or generates IoT data. For example, IoT device 115 may be implemented to include various technologies, such as a sensor, a tag, a camera, an antenna, etc., that collects, obtains, and/or generates IoT data. IoT devices 115 may provide data with different levels of delay tolerance, as determined, for example, by the owners/users of IoT devices 115. According to various implementations, IoT device 115 may be a stationary device or a mobile device. IoT device 115 may include a component (e.g., a Global Positioning System (GPS) chipset, etc.) that provides location-aware functionality. IoT device 115 may be powered by an internal source, an external source, a battery, an outlet, electromagnetic waves, and so forth. Non-limiting examples of IoT devices 115 include a meter (e.g., a utility meter, a parking meter, etc.), a sensor (e.g., a weather sensor, a traffic sensor, a home appliance sensor, an indoor environment sensor, etc.), a video camera (e.g., a security video camera, a video camera to capture social information at an establishment (e.g., number of persons in a bar, restaurant, etc.) etc.), a LoJack® device, a vehicle telematics device, a tag (e.g., to collect location data pertaining to public transportation vehicles (e.g., busses, subways, trains, public service vehicle, etc.), a dongle, a smartphone (e.g., to collect location data pertaining to a mobile device and/or its user), a medical device, vending machine, etc.

According to implementations described herein, IoT device 115 may include a device with relatively simple processing capabilities and features particularly suited for machine-type communication (MTC) applications, such as low cost, long battery life, low data rates, etc. IoT device 115 may exchange traffic with accepter 110 via a wireless interface. For example, IoT device 115 may include a Bluetooth transceiver or a Wi-Fi transceiver to send local wireless signals 150. In other implementations, IoT device 115 may include a Long-Term Evolution (LTE) transceiver (e.g., for backup).

Scheduler 120 may include a network device or computational device to schedule connection requests among base station 105, acceptors 110, and IOT devices 115 over one or more wireless networks. Scheduler 120 may also allocate physical layer (e.g., media access control (MAC) layer) resources to be used for transmissions between base station 105 and accepters 110. Scheduler 120 may apply scheduling algorithms which determine what IoT traffic gets sent, what network route is assigned, and/or when the IoT traffic gets sent over portions of network environment 100

Core network 130 includes one or multiple networks of one or multiple types. For example, core network 130 may be implemented to include a terrestrial network, a satellite network, a wireless network, and/or a wired network. According to an exemplary implementation, core network 130 includes a complimentary network pertaining to one or multiple access networks for base station 105. For example, core network 130 may include the core part of an LTE network, an LTE-A network, etc. Depending on the implementation, core network 130 may include various network elements, such as a gateway, a support node, a serving node, a router, a switch, a bridge, as well other network elements pertaining to various network-related functions, such as billing, security, authentication and authorization, network policies, subscriber profiles, etc.

Data network 140 may include one or more wired and/or wireless networks. For example, data network 140 may include the Internet, a public land mobile network (PLMN), and/or another network. Additionally, or alternatively, data network 140 may include a local area network (LAN), a wide area network (WAN), a metropolitan network (MAN), the Public Switched Telephone Network (PSTN), an ad hoc network, a managed Internet protocol (IP) network, a virtual private network (VPN), an intranet, the Internet, a fiber optic-based network, and/or a combination of these or other types of networks.

The quantity of devices and/or networks, illustrated in FIG. 1, is provided for explanatory purposes only. In practice, there may be additional devices and/or networks, fewer devices and/or networks, different devices and/or networks, or differently arranged devices and/or networks than those illustrated in FIG. 1. For example, while a single base station 105 is shown in FIG. 1, in practice thousands of base stations 105 may be included in network environment 100. Also, scheduler 120 may interface with multiple base stations 105, each with multiple accepters 110.

Figure 2:
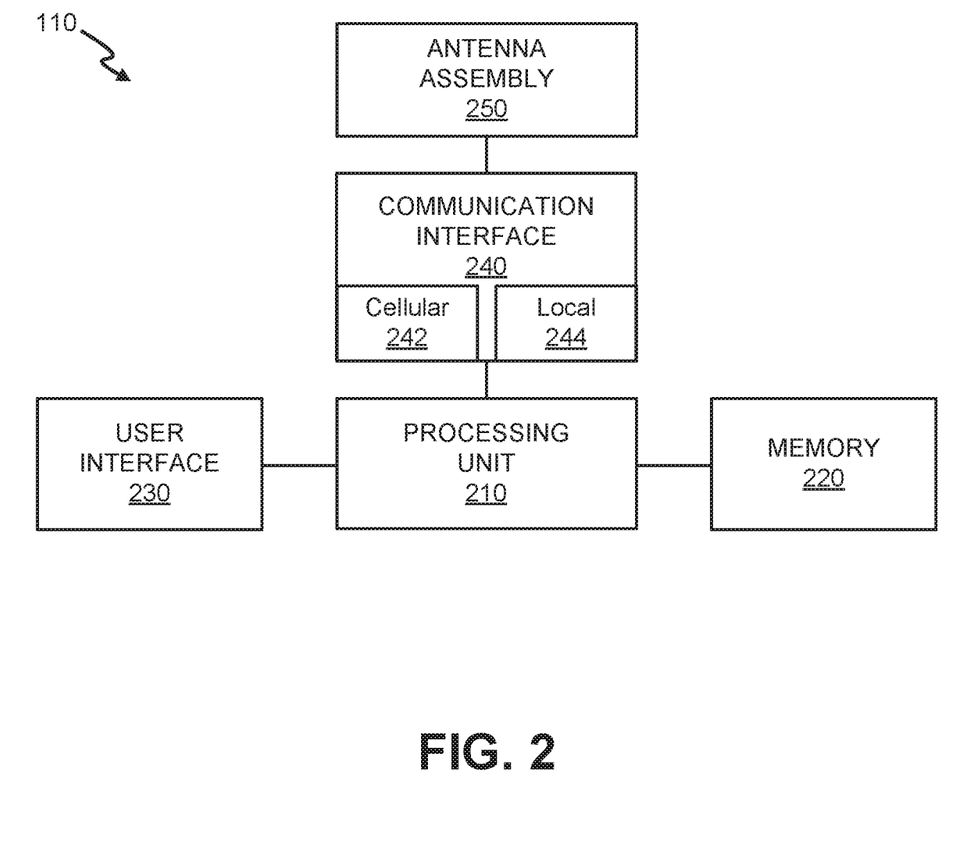
FIG. 2 is a diagram of exemplary components that may be included in an accepter device included in the network environment shown in FIG. 1.

FIG. 2 is a diagram of exemplary components that may be included in accepter 110. As shown in FIG. 2, accepter 110 may include a processing unit 210, a memory 220, a user interface 230, a communication interface 240, and an antenna assembly 250.

Processing unit 210 may include one or more processors, microprocessors, application specific integrated circuits (ASICs), field programmable gate arrays (FPGAs), and/or other processing logic. Processing unit 210 may control operation of accepter 110 and its components.

Memory 220 may include a random access memory (RAM) or another type of dynamic storage device, a read only memory (ROM) or another type of static storage device, a removable memory card, and/or another type of memory to store data and instructions that may be used by processing unit 210. In one implementation, memory 220 may buffer lower priority traffic received from IoT devices 115 during periods of congestion for base station 105.

User interface 230 may include mechanisms for inputting information to accepter 110 and/or for outputting information from accepter 110. Examples of input and output mechanisms might include a speaker to receive electrical signals and output audio signals; a microphone to receive audio signals and output electrical signals; buttons (e.g., a joystick, control buttons, a keyboard, or keys of a keypad) and/or a touchscreen to permit data and control commands to be input into accepter 110; a display, such as an Liquid Crystal Display (LCD), to output visual information; and/or any other type of input or output device. In some embodiments, accepter 110 may be managed remotely and may not include user interface 230. In other words, accepter 110 may be "headless" and may not include an input device and/or an output device.

Communication interface 240 may include one or more Radio Frequency (RF) transceivers that enable accepter 110 to communicate with IoT devices 115 via wireless communications and one or more RF transceivers that enable accepter 110 to communicate with base station 105 via wireless communications. An RF transceiver may include an RF transmitter that receives signals to be transmitted wirelessly and performs signal processing on the signals before providing the signals to antenna assembly 250, and an RF receiver that receives signals from antenna assembly 250 and performs signal processing on the received signals before providing the received signals to processing unit 210. For example, the RF transceiver may perform analog-to-digital and digital-to-analog conversion, modulation and demodulation, up-conversion and down-conversion, and/or amplification of signals. In one implementation, communication interface 240 may include a cellular transceiver 242 to process broadband cellular signals to/from base station 105 and a local wireless transceiver 244 to process signals to/from IoT devices via a local wireless network frequency, such as IEEE 802.11x (Wi-Fi) or IEEE 802.15 (Bluetooth) standards.

Antenna assembly 250 may include one or more antennas to transmit and/or receive RF signals over the air. Antenna assembly 250 may, for example, receive RF signals from communication interface 240 and transmit the signals over the air and receive RF signals over the air and provide them to communication interface 240.

As described herein, accepter 110 may perform certain operations in response to processing unit 210 executing software instructions contained in a computer-readable medium, such as memory 220. A computer-readable medium may be defined as a non-transitory memory device. A non-transitory memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes to facilitate receiving and forwarding of traffic from IoT devices 115. Alternatively, hardwired circuitry may be used in place of, or in combination with, software instructions to implement processes described herein. Thus, implementations described herein are not limited to any specific combination of hardware circuitry and software.

Although FIG. 2 shows example components of accepter 110, in other implementations, accepter 110 may include fewer components, different components, differently arranged components, or additional components than those depicted in FIG. 2. Additionally or alternatively, one or more components of accepter 110 may perform the tasks described as being performed by one or more other components of accepter 110.

Figure 3:
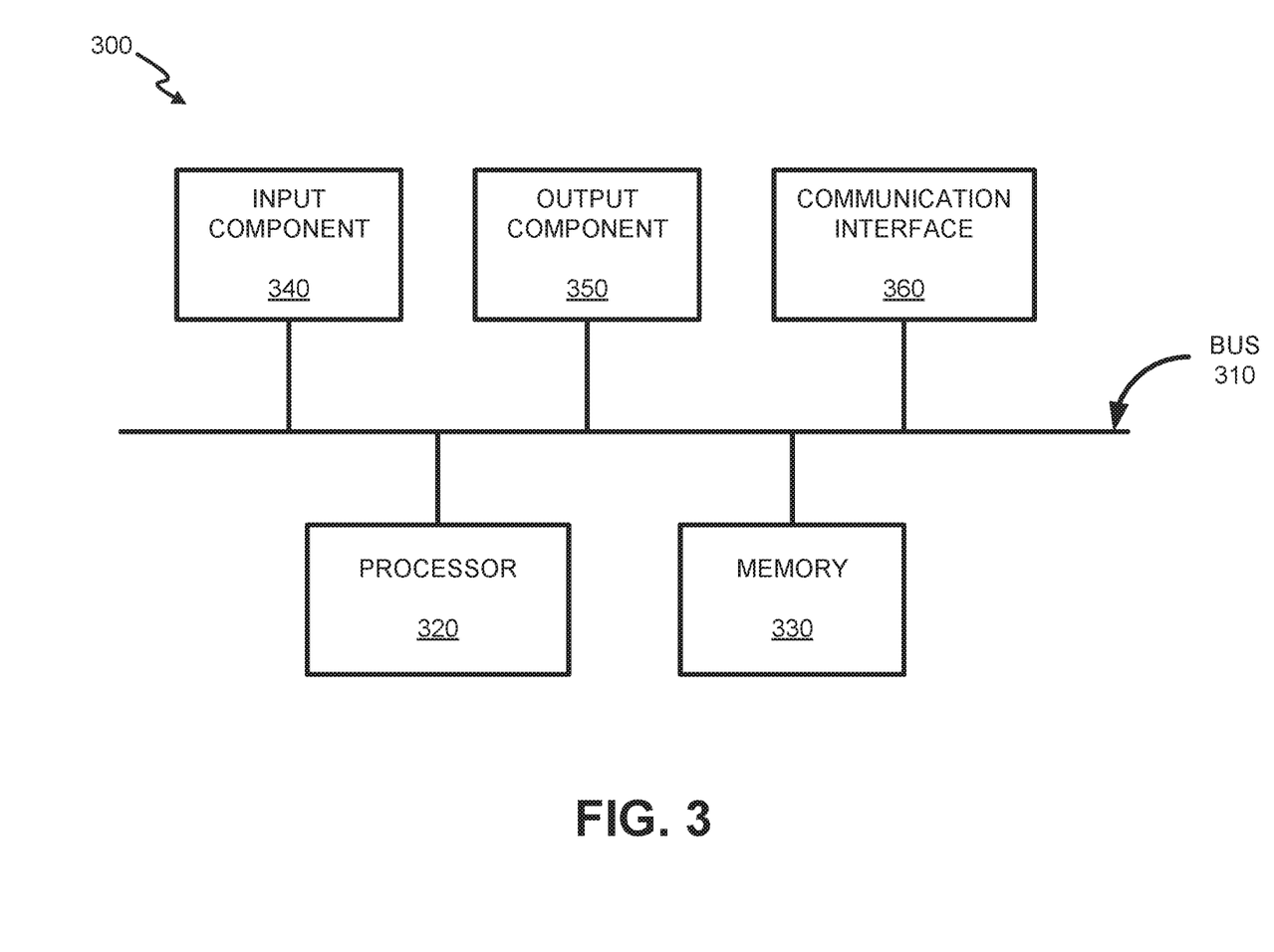
FIG. 3 is a diagram of exemplary components that may be included in a scheduling device included in the network environment shown in FIG. 1.

FIG. 3 is a diagram illustrating exemplary components of a device 300. Device 300 may correspond, for example, to scheduler 120, a component of core network 130, or a component of data network 140.

Device 300 may include a bus 310, a processor 320, a memory 330, an input component 340, an output component 350, and a communication interface 360. Although FIG. 3 shows exemplary components of device 300, in other implementations, device 300 may contain fewer components, additional components, different components, or differently arranged components than those depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Bus 310 may include a path that permits communication among the components of device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320. Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include a transceiver that enables device 300 to communicate with other devices and/or systems via wireless communications, wired communications, or a combination of wireless and wired communications. For example, communication interface 360 may include mechanisms for communicating with another device or system via a network. Communication interface 360 may include an antenna assembly for transmission and/or reception of RF signals. For example, communication interface 360 may include one or more antennas to transmit and/or receive RF signals over the air. Communication interface 360 may, for example, receive RF signals and transmit them over the air to base station 105/IoT device 115, and receive RF signals over the air from base station 105/IoT device 115. In one implementation, for example, communication interface 360 may communicate with a network and/or devices connected to a network. Alternatively or additionally, communication interface 360 may be a logical component that includes input and output ports, input and output systems, and/or other input and output components that facilitate the transmission of data to other devices.

Device 300 may perform certain operations in response to processor 320 executing software instructions contained in a computer-readable medium, such as memory 330. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Device 300 may include fewer components, additional components, different components, and/or differently arranged components than those illustrated in FIG. 3. As an example, in some implementations, a display may not be included in device 300. In these situations, device 300 may be a "headless" device that does not include input component 340. Additionally, or alternatively, one or more operations described as being performed by a particular component of device 300 may be performed by one or more other components, in addition to or instead of the particular component of device 300.

Figure 4:
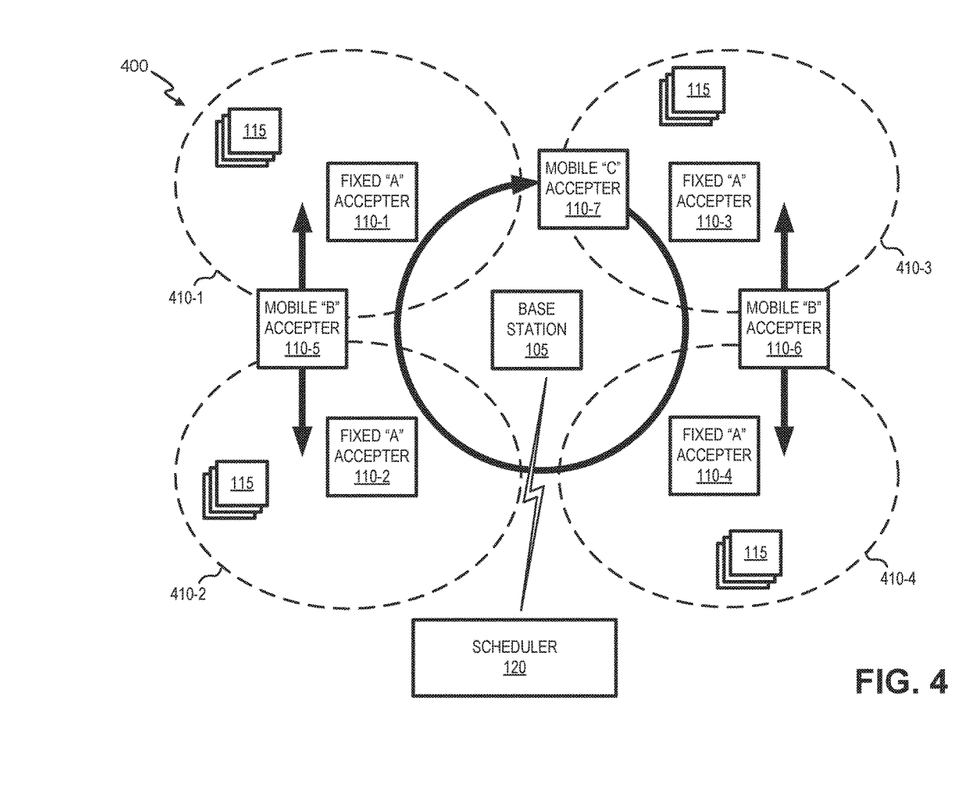
FIG. 4 is a diagram showing an exemplary implementation of accepter devices in a portion of the network environment shown in FIG. 1.

FIG. 4 is a diagram showing an exemplary implementation of accepters 110 in a portion 400 of network environment 100. As shown in FIG. 4, network portion 400 may include a base station 105, seven accepters 110-1 through 110-7, and scheduler 120 to facilitate delivery of traffic from IoT devices 115 in separate areas 410-1 through 410-4.

According to implementations described herein, a service provider may categorize IoT connections from IoT devices 115 into different profiles based on the urgency (or delay tolerance) of a connection request. As an example, a service provider may provide three profile categories (e.g., "A," "B," and "C") for IoT connections:

Connection Profile A: immediate real-time traffic
Connection Profile B: every 15 minutes
Connection Profile C: every hour or longer The delay intervals of connection profile B (every 15 minutes) and connection profile C (every hour) are for example only. Other delay intervals may be associated with the connection profiles. Customers of the service provider can register their IoT devices 115 and choose a profile category based on the customers' needs. For instance, a highway traffic operator may choose option A above to send videos of highway traffic condition over network environment 100 in real time. Conversely, an electricity company may choose option C to send delay-tolerant electric meter readings over network environment 100.

In the example arrangement of FIG. 4, fixed accepter 110-1 may provide a local wireless network with a range defined as area 410-1; fixed accepter 110-2 may provide a local wireless network with a range defined as area 410-2; fixed accepter 110-3 may provide a local wireless network with a range defined as area 410-3; and fixed accepter 110-4 may provide a local wireless network with a range defined as area 410-4. Generally, each IoT device 115 in each area 410 may be pre-registered to provide traffic in a particular profile category (e.g., A, B, or C, described above). Accepters 110 may also be categorized into groups according to how they interface with IoT devices having different connection profiles. For example, Accepter type A: Accept requests from connection profile A, B or C
Accepter type B: Accept requests from connection profile B or C
Accepter type C: Accept requests from connection profile C Type A accepters 110-1 through 110-4 may be deployed at fixed locations. Type B and C accepters 110-5 through 110-7 may be deployed in connection with a mobile object (e.g., a vehicle or drone). Connection requests bridged by accepters 110 may be provisioned with different priority levels. For example, each accepter 110 may mark outgoing traffic to base station 105 with a particular quality of service class identifier (QCI). Connection requests bridged by type A accepters 110-1 through 110-4 are marked with the highest QCI. Conversely, connection requests bridged by type C accepters 110-7 are marked with the lowest QCI. Thus:

Request bridged by accepter type A: High QCI
Request bridged by accepter type B: Middle QCI
Request bridged by accepter type C: Low QCI Scheduler 120 may communicate with accepters 110 (e.g., via base station 105 or another base station). For example, scheduler 120 may coordinate position and timing of mobile "B" and "C" accepters 110-5 through 110-7 to reduce traffic loads on fixed "A" accepters 110-1 through 110-4.

Generally, areas 410-1 through 410-4 may be considered close to each other. Each area 410 may include multiple IoT devices 115 with different connection profiles, including connection profile A (e.g., real-time traffic), connection profile B (e.g., connections every 15 minutes), and connection profile C (e.g., connections every hour or more). Fixed "A" accepters 110-1 through 110-4 are be deployed in every area 410 at fixed locations to bridge immediate real-time connections. Mobile "B" accepters 110-5 and 110-6 are shared by two areas 410 to bridge connections from IoT devices 115 with connection profiles B or C. More particularly, mobile "B" accepter 110-5 moves between area 410-1 and area 410-2 (as illustrated in the arrow in FIG. 4); while mobile "B" accepter 110-6 moves between area 410-3 and area 410-4 (as illustrated in the arrow). Mobile "C" accepter 110-7 is shared by all four areas 410 to bridge connections from IoT devices 115 with connection profile C. Thus, mobile "C" accepter 110-7 may move among any of areas 410-1 through 410-4 (e.g., as directed by scheduler 120 and as indicated by the arrow in FIG. 4).

In the arrangement of FIG. 4, fixed "A" accepters 110-1 through 110-4 accept connection requests from IoT devices 115 with connection profile A and relay the connection requests to base station 105 immediately. Fixed "A" accepters 110-1 through 110-4 also accept connection requests from IoT devices 115 with connection profiles B and C within 15 minutes and 1 hour, respectively, if the capacities of fixed "A" accepters 110-1 through 110-4, base station 105, and core network 130 (as monitored by scheduler 120) are adequate.

Any of fixed "A" accepters 110-1 through 110-4 can signal for support from scheduler 120 when an accepter 110 determines that its own capacity or a backend network portion's capacity is inadequate for a current traffic load. When inadequate capacity or congestion for one of fixed "A" accepters 110-1 through 110-4 is detected, scheduler 120 may assign mobile "B" accepter 110-5 or 110-6 to the congested area 410. The assigned mobile "B" accepter 110-5 or 110-6 for the respective area 410 may accept connection requests from IoT devices 115 with connection profiles B and C, while the overloaded fixed "A" accepter 110 may temporarily accept only connection requests from IoT devices 115 with connection profile A. When inadequate capacity for one of mobile "B" accepters 110-5 or 110-6 is detected, scheduler 120 may assign mobile "C" accepter 110-7 to the congested area 410. The assigned mobile "C" accepter 110-7 for the respective area 410 may accept connection requests only from IoT devices 115 with connection profile C, while the overloaded mobile "B" accepter 110 may temporarily accept only connection requests from IoT devices 115 with connection profile B.

In one implementation, any of accepters 110 may detect that traffic levels have returned to uncongested level and signal scheduler 120. In another implementation, scheduler 120 may detect a return to uncongested network conditions via other network monitoring devices. In any event, when traffic levels return to a lower level that can be supported by fixed "A" accepter 110, scheduler 120 may selectively return routing of connection requests from IoT devices 115 with connection profiles B and C, to the impacted fixed "A" accepter 110. Alternatively, when traffic levels return to a lower level that can be supported by fixed "A" accepter 110 and mobile "B" accepter 110, scheduler 120 may selectively return routing of connection requests from IoT devices 115 with connection profiles C, to mobile "B" accepter 110.

In other implementations, scheduler 120 may direct mobile "B" accepters 110-5 and 110-6 and/or mobile "C" accepter 110-7 in other sequences to accommodate high traffic volumes in network portion 400. For example, in some instances, scheduler 120 may direct mobile "C" accepter 110-7 to a congested area 410 before one of mobile "B" accepters 110-5 or 110-6. In other implementations, any of mobile accepters 110-5 through 110-7 may buffer traffic from IoT devices to manage congestion at base station 105. In still other implementations, mobile "B" accepters 110-5 and 110-6 and/or mobile "C" accepter 110-7 may be used to service areas associated with another base station (not shown).

Figure 5:
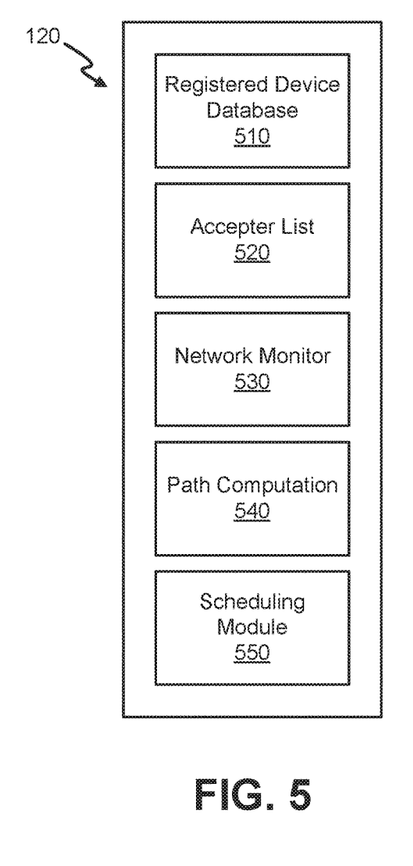
FIG. 5 is a diagram showing modules of the scheduler of FIG. 1.

FIG. 5 is an example of modules that may be included in scheduler 120. In one implementation, the function of modules described in connection with FIG. 5 may be implemented by one or more components of device 300 (FIG. 3). As shown in FIG. 5, scheduler 120 may include a registered device database 510, an accepter list 520, a network monitor 530, a path computation module 540, and an accepter scheduling module 550.

Registered device database 510 may include a database, table, or another memory structure that includes a list of IoT devices 115 that are registered with the service provider. A record for each registered IoT device 115 may include, for example, a unique identifier for the IoT device 115, a connection profile (e.g., "A," "B," or "C" as selected by the customer), an IP address, a primary fixed accepter identifier, a fixed/mobile indication for the IoT device, and/or a list of wireless communication capabilities (e.g., Wi-Fi, Bluetooth, LTE, etc.) for the IoT device.

Accepter list 520 may include a database, table, or another memory structure that includes a list of accepters 110. A record for each accepter 110 may include, for example, a unique identifier for the accepter 110, an accepter type (e.g., "A," "B," or "C" as designated by the service provider), a network identifier (e.g., a mobile station equipment identity (IMEI), a mobile equipment identifier (MEID), a universally unique identifier (UUID), etc.), a location, and a list of wireless communication capabilities (e.g., Wi-Fi, Bluetooth, LTE, etc.) for the accepter.

Network monitor 530 may communicate with one or more devices to monitor traffic levels in network environment 100. In one implementation, network monitor 530 may receive signals from accepters 110 to indicate local conditions, such as congestion or lack of congestion for an individual accepter 110. In one implementation, network monitor 530 may track network performance and/or resource use data from other devices. For example, in one implementation, network monitor 530 may track bandwidth use data correlated to particular areas, products, and/or activities. Network monitor 530 may also incorporate thresholds for network activity to identify predictive trends. In one implementation, data for network monitor 530 may be updated in real time or near-real time. In another implementation, network monitor 530 may predict an instance of inadequate network capacity in a portion of network environment 100 based on historical trends.

Path computation module 540 may perform constraint-based path computations to determine a suitable route through a network for conveying IoT data between a source (e.g., accepter 110 or IoT device 115) and a destination. Path computation module 540 may obtain network traffic measurements from network monitor 530 and provide routing guidance for connections according to the category of accepter 110 or the QCI value associated with a particular connection request. For example, a path for a connection request directed by fixed "A" accepter 110-1 with a high QCI value would be given higher priority than a path for a connection request by mobile "B" accepter 110-5 with a middle QCI value.

In one implementation, path computation module 540 may score available paths and determine the priority of a request based on the theory of molecule filter Similar to the way a molecule filter allows the largest molecules to pass through the filter before smaller molecules, a connection request directed by fixed "A" accepter 110-1 may be treated as the largest molecule traveling through a filter. Thus, path computation module 540 may select the available network route with the best score for that connection. Another connection request directed by mobile accepter "C" 110-7 may be treated as the smallest molecule traveling through a filter. Thus, path computation modules 540 may select the available network route with the lowest score for the low QCI connection. Path scores can be measured using factors such as travel distance towards a destination, level of traffic congestion, etc.

Accepter scheduling module 550 may coordinate movement of mobile accepters 110 to alleviate potential congestion at fixed accepters 110. In one implementation, accepter scheduling module 550 may direct movement of a mobile accepter within an area 410 or between two or more areas 410. Accepter scheduling module 550 may apply trend analysis (e.g., from network monitor 530) to enable positioning of mobile accepters 110 within an area 410 before a negative network experience actually occurs.

Although FIG. 5 shows exemplary modules of scheduler 120, in other implementations, scheduler 120 may include fewer modules, different modules, or additional modules than those depicted in FIG. 5.

Figure 6A:
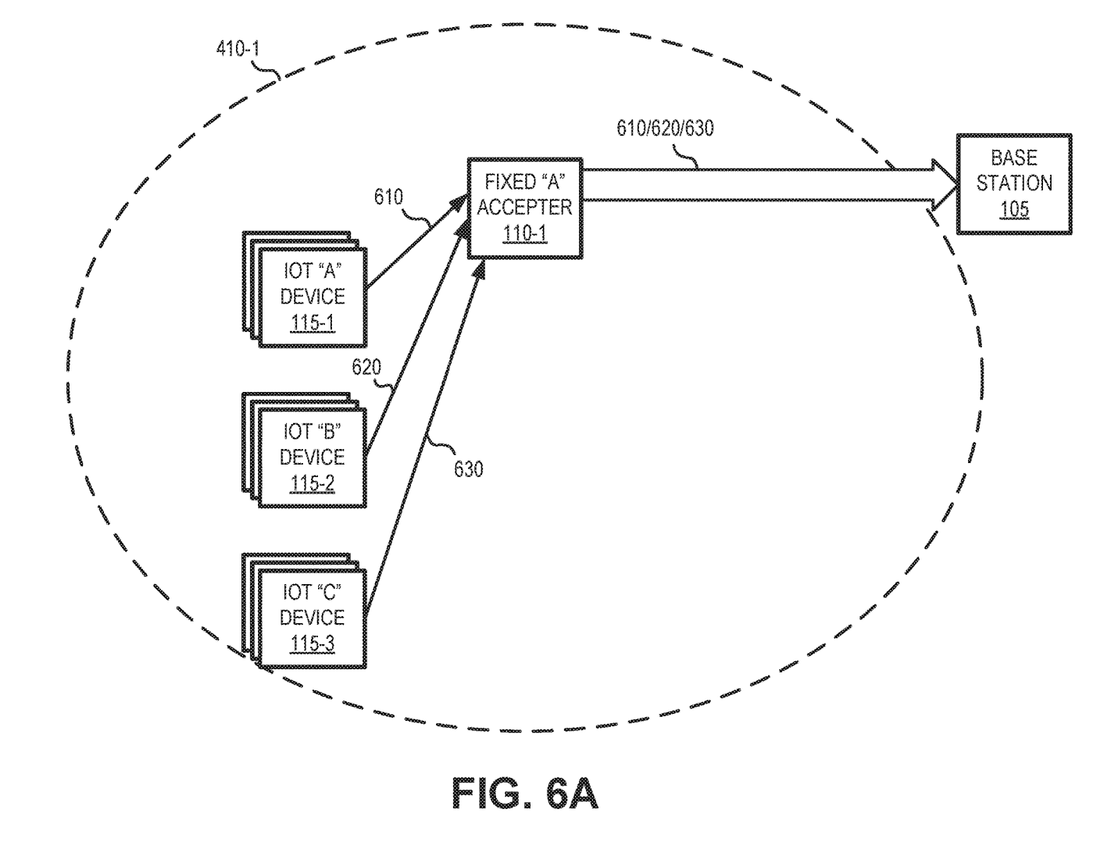
FIGS. 6A-6C are diagrams showing exemplary communications in a portion of the network environment of FIG. 4.
Figure 6B:
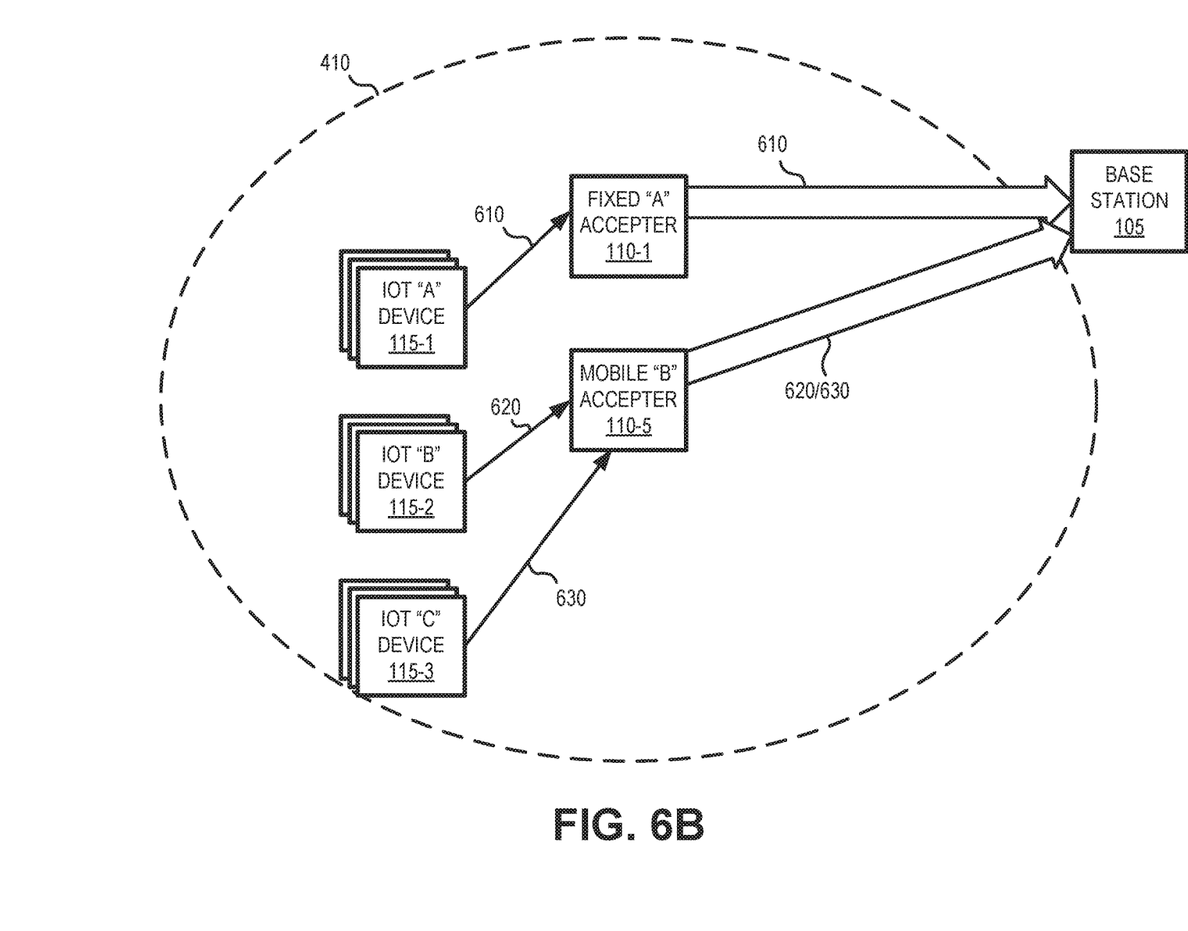
Figure 6C:
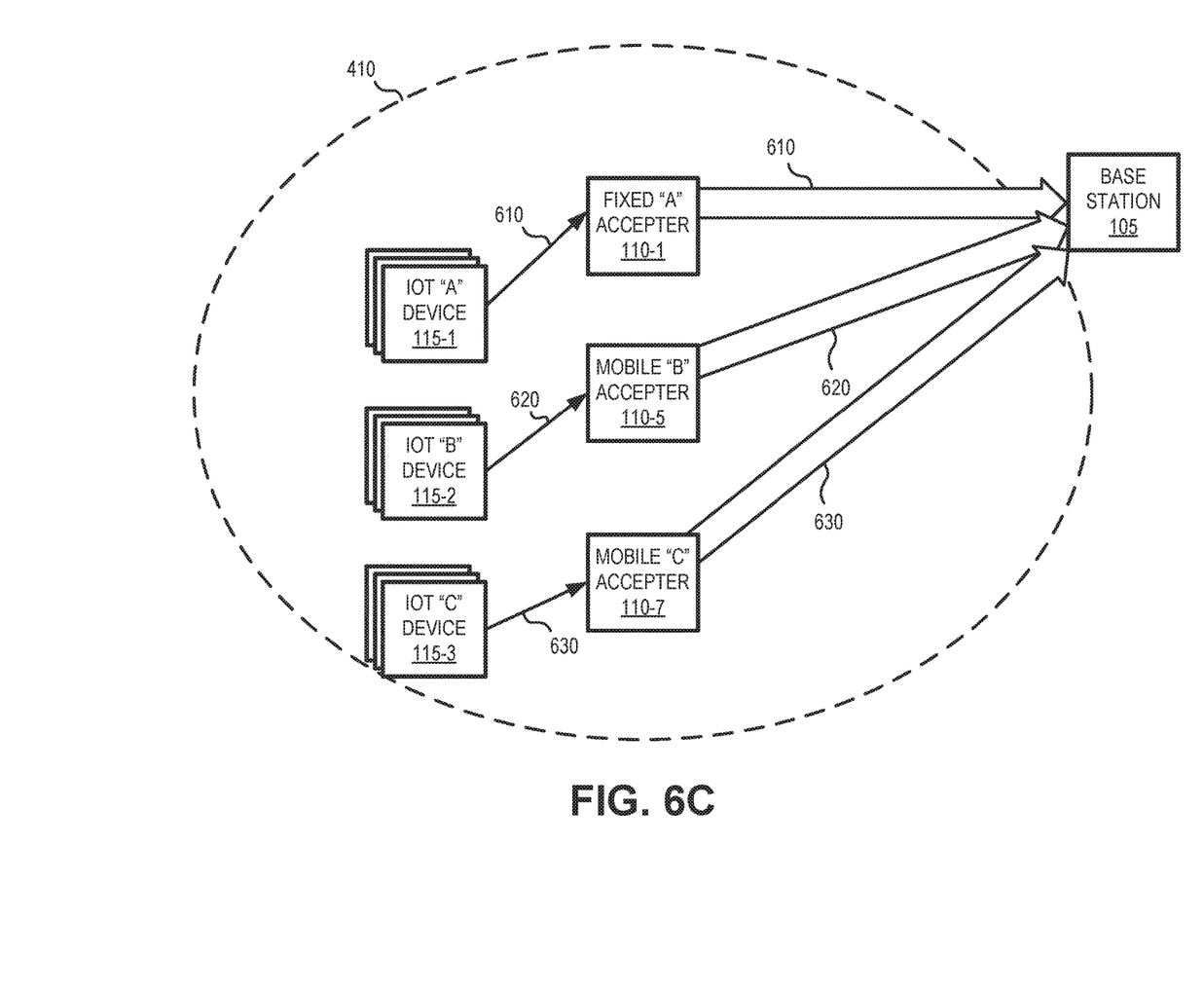

FIGS. 6A-6C are diagrams showing exemplary communications in a particular area 410-1 of portion 400 of network environment 100. Area 410-1 has multiple IOT devices 115 including IoT "A" device 115-1 with connection profile "A" (e.g., real-time traffic), IoT "B" device 115-2 with connection profile "B" (e.g., connections every 15 minutes), and IoT "C" device 115-3 with connection profile "C" (e.g., connections every hour or more).

As shown in FIG. 6A, during typical network usage levels, for example, fixed "A" accepter 110-1 may accept connection requests 610 from IoT devices 115-1 with connection profile "A," connection requests 620 from IoT devices 115-2 with connection profile "B," and connection requests 630 from IoT devices 115-3 with connection profile "C." Each of connection requests 610/620/630 may include a connection profile indication that can be detected by any accepter 110. Fixed "A" accepter 110-1 may relay connection requests 610 for profile A communications to base station 105 immediately, while relaying connection requests 620/630 for profiles "B" and "C" communications to base station 105 within required QCI timeframes.

Assume, at some point in time, the number of combined connection requests 610/620/630 may approach a congestion threshold for fixed "A" accepter 110-1. A congestion threshold may be detected by accepter 110-1, base station 105, scheduler 120 (not shown in FIG. 6A), or another network device. A congestion threshold may include, for example, a particular percent capacity (e.g., 80%) of available buffer capacity for an interface, a percentage of available spectrum capacity, a particular count of dropped packets within a timer interval, etc.

Referring to FIG. 6B, when congestion (or a trend toward congestion) is detected (e.g., at fixed "A" accepter 110-1 or base station 105), scheduler 120 may direct mobile "B" accepter 110-5 into range of IoT devices 115 in area 410-1. When positioned in an appropriate geographic location to receive signals, mobile "B" accepter 110-5 may begin to accept connection requests 620 from IoT devices 115-2 with connection profile "B," and connection requests 630 from IoT devices 115-3 with connection profile "C." Mobile "B" accepter 110-5 may relay connection requests 620/630 for profiles "B" and "C" communications to base station 105 within required QCI timeframes. When mobile "B" accepter 110-5 begins to accept connection requests 620/630, scheduler 120 may direct fixed "A" accepter 110-1 to accept only connection requests 610.

Referring to FIG. 6C, when congestion (or trend) is again detected (e.g., at mobile "B" accepter 110-5 or base station 105), scheduler 120 may direct mobile "C" accepter 110-7 into range of IoT devices 115 in area 410-1. When positioned in an appropriate geographic location to receive signals, mobile "C" accepter 110-7 may begin to accept connection requests 630 from IoT devices 115-3 with connection profile "C." Mobile "C" accepter 110-7 may relay connection requests 630 for profile "C" communications to base station 105 within required QCI timeframes. When mobile "C" accepter 110-7 begins to accept connection requests 630, scheduler 120 may direct mobile "B" accepter 110-5 to accept only connection requests 620, while fixed "A" accepter 110-1 continues to accept only connection requests 610. In some implementations, mobile "B" accepter 110-5 and/or mobile "C" accepter 110-7 may temporarily cache connection data from IoT devices 115-2 and/or IoT devices 115-3 to prevent congestion at base station 105 or EPC 130.

Although FIGS. 6A-6C show exemplary communications within network portion 400, in other implementations, network portion 400 may use fewer communications, different communications, and/or additional communications than those depicted in FIGS. 6A-6C.

Figure 7:
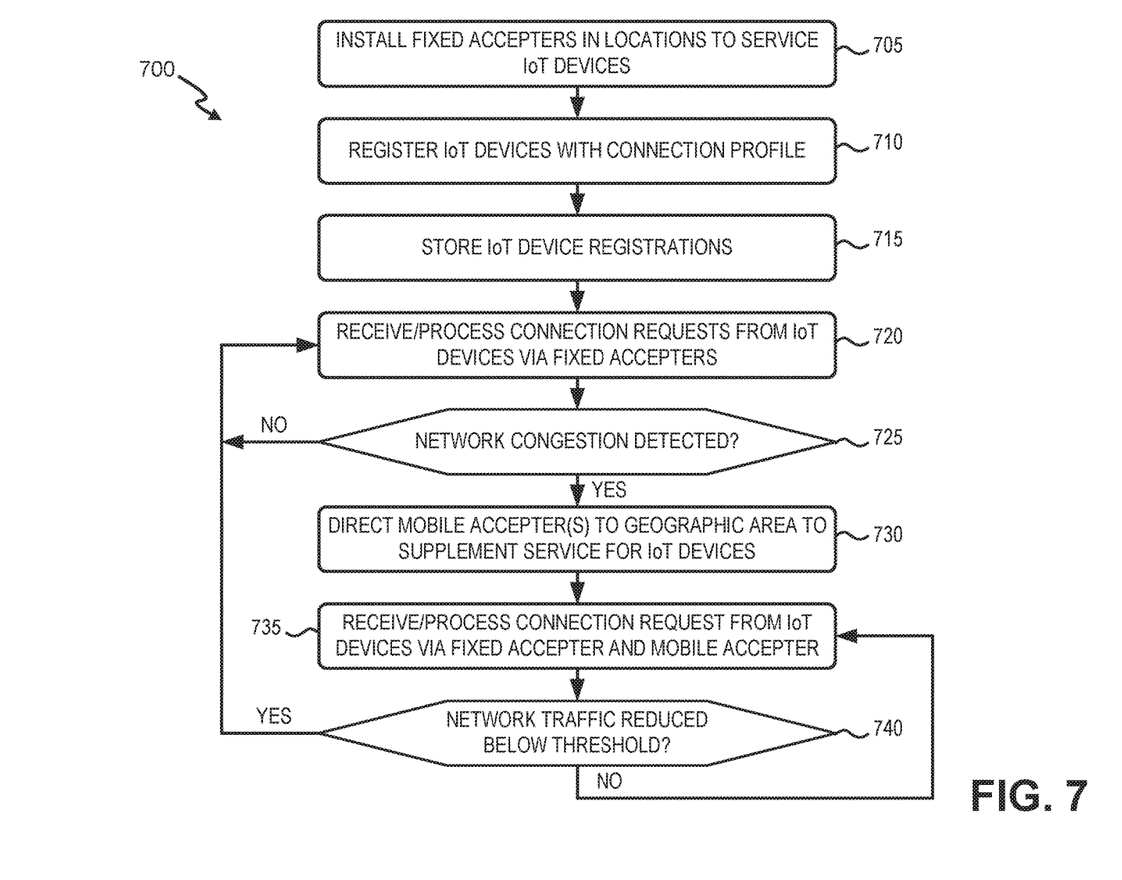
FIG. 7 is a flow diagram illustrating an exemplary process for managing IoT device traffic using accepters, according to an implementation described herein.

FIG. 7 is a flow diagram illustrating an exemplary process 700 for managing IoT device traffic using accepters 110. In one implementation, process 700 may be implemented by scheduler 120. In another implementation, process 700 may be implemented by scheduler 120 in conjunction with one or more other devices in network environment 100, such as one or more devices in core network 130.

Process 700 may include installing fixed accepters in locations to service IoT devices (block 705), registering the IoT devices with a connection profile (block 710), and storing the IoT device registrations (block 715). For example, a service provider may install accepters 110 (e.g., fixed-location accepters) in a geographic location based on a demand or projected demand for IoT connections with core network 130. Each fixed-location accepter 110 may support a geographic area (e.g., area 410) based on a local wireless network range. Customers may register IoT devices 115 with the service provider to enable service via accepters 110 and to permit IoT traffic management by scheduler 120. Each of the registration records may include a connection profile that indicates a delay tolerance for connections by each IoT device 115. The list of registered IoT devices 115 may be stored, for example, in registered device database 510.

Process 700 may further include receiving and processing connection requests from IoT devices via fixed accepters (block 720), and determining if there is network congestion (block 725). For example, as shown in FIG. 4, fixed "A" accepters 110-1 through 110-4 accept connection requests from IoT devices 115 with connection profile A and relay the connection requests to base station 105 immediately. Fixed "A" accepters 110-1 through 110-4 also accept connection requests from IoT devices 115 with connection profiles B and C within 15 minutes and 1 hour, respectively, while the capacities of fixed "A" accepters 110-1 through 110-4, base station 105, and core network 130 (as monitored by scheduler 120) are adequate. Any of fixed "A" accepters 110-1 through 110-4 can signal for support from scheduler 120 when an accepter 110 determines that its own capacity or a backend network portion's capacity is (or is projected to become) inadequate for an IoT traffic load.

If no network congestion is detected (block 725—NO), process 700 may continue to receive and process connection requests from IoT devices via fixed accepters at block 720. If network congestion is detected (block 725—YES), process 700 may include directing one or more mobile accepters to a geographic area to supplement service for IoT devices (block 730). For example, when inadequate capacity for one of fixed "A" accepters 110-1 through 110-4 is detected, scheduler 120 may assign mobile "B" accepter 110-5 or 110-6 to the congested area 410. The assigning may include, for example, signaling relocation of a service vehicle or drone that carries mobile "B" accepter 110-5 or 110-6.

Process 700 may also include receiving and processing connection requests from IoT devices via both fixed accepters and mobile accepters in the same geographic area (block 735), and monitoring the network traffic levels (block 740). For example, once in place, mobile "B" accepter 110-5 or 110-6 for the respective area 410 may accept connection requests from IoT devices 115 with connection profiles B and C, while the overloaded fixed "A" accepter 110 may temporarily accept only connection requests from IoT devices 115 with connection profile A when the network traffic remains above the threshold (block 740-NO). In one implementation, scheduler 120 may synchronize timing with the fixed "A" accepter 110 and the mobile "B" accepter 110 to implement new connection request acceptance procedures. When traffic levels return to a lower level that can be supported by fixed "A" accepter 110, scheduler 120 may selectively return routing of connection requests from IoT devices 115 with connection profiles B and C, to the impacted fixed "A" accepter 110 (block 740—YES).

Figure 8:
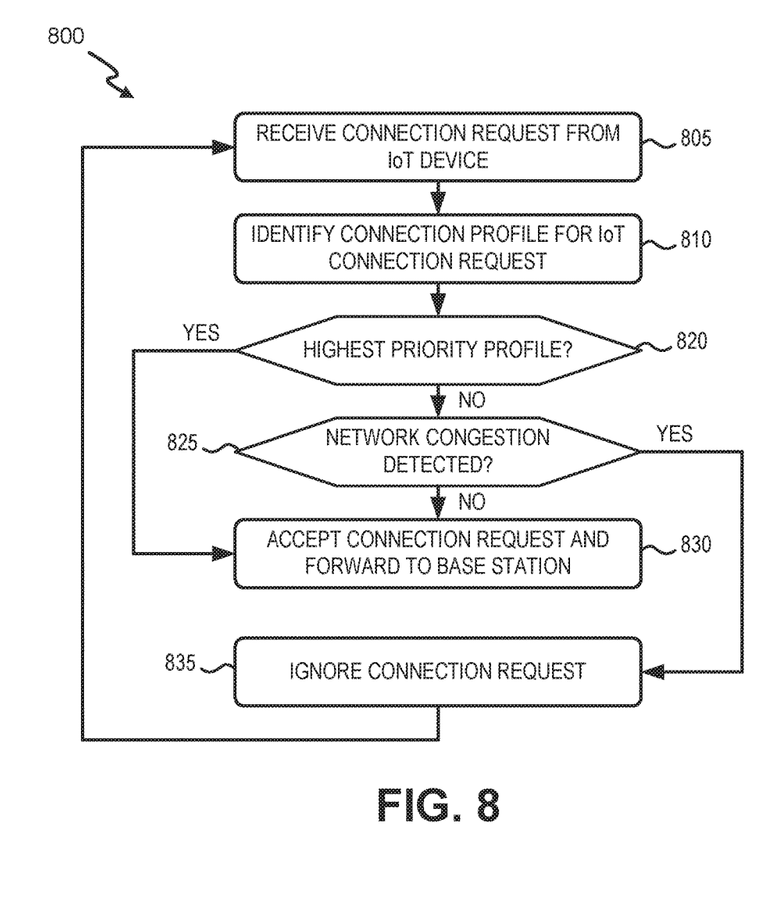
FIG. 8 is a flow diagram illustrating an exemplary process for bridging IoT device traffic to a core network, according to an implementation described herein.

FIG. 8 is a flow diagram illustrating an exemplary process 800 for bridging IoT device traffic to a core network. In one implementation, process 800 may be implemented by accepter 110. In another implementation, process 800 may be implemented by accepter 110 in conjunction with one or more other devices in network environment 100, such as one or more devices in core network 130.

Process 800 may include receiving a connection request from an IoT device (block 805), and identifying a connection profile for the IoT connection request (block 810). For example, as shown in FIG. 6A, fixed "A" accepter 110-1 may receive a connection request from an IoT device 115 in area 410-1 via a local wireless signal. The request may include a connection profile identifier, such as one of connection profiles A, B, or C described above, which can be detected by fixed "A" accepter 110-1.

Process 800 may also include determining if the connection profile is a highest priority profile (block 820). For example, fixed "A" accepter 110-1 may detect connection profile A for the connection request, which would be accepted and forwarded in all circumstances.

If the connection profile is not a highest priority profile (block 820—NO), process 800 may include determining if there is network congestion (block 830). For example, fixed "A" accepter 110-1 may detect connection profile B or C for the connection request, which may not be accepted by fixed "A" accepter 110-1 if there is inadequate capacity.

If the connection profile is a highest priority profile (block 820—YES) or if there is no network congestion detected (block 825—NO), process 800 may include accepting the connection request and forwarding the connection request to a base station (block 830). For example, fixed "A" accepter 110-1 may forward the connection request to base station 105 via a cellular broadband connection if the connection request includes connection profile A or if there are sufficient network resources.

If network congestion is detected (block 825—YES), process 800 may include ignoring the connection request for some types of requests (block 835). For example, fixed "A" accepter 110-1 may ignore the connection request from IoT device 115 if the connection request includes a connection profile B or C and there are inadequate network resources.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 7 and 8, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a network device, registration records for multiple machine-type communication (MTC) devices, each of the registration records including a connection profile that indicates a level of delay tolerance for connections, to a service provider network, by each MTC device of the multiple MTC devices;
    receiving, by a fixed-location accepter device and via wireless signals, connection requests from the multiple MTC devices, wherein each of the connection requests includes a connection profile indicator;
    receiving, by the network device, an indication of inadequate capacity to accept all the connection requests from the multiple MTC devices; and
    directing, by the network device and in response to receiving the indication, a mobile accepter device into a geographic area, wherein the mobile accepter device is configured to accept at least a portion of the connection requests, via the wireless signals, the portion of the connection requests including connection profile indicators that indicate a tolerance for delay.

2. The method of claim 1, further comprising
    forwarding, by the fixed-location accepter device, a first connection request, of the connection requests, immediately when the connection profile indicator indicates no delay tolerance.

3. The method of claim 2, wherein forwarding the first connection request includes:
    forwarding the first connection request to a base station via a cellular broadband signal.

4. The method of claim 3, wherein forwarding the first connection request further includes:
    including a quality of service class identifier (QCI) value that corresponds to the connection profile indicator.

5. The method of claim 2, further comprising:
    forwarding, by the fixed-location accepter device, a second connection request, of the connection requests, within a first time interval when the connection profile indicator indicates a tolerance for delay.

6. The method of claim 5, further comprising:
    forwarding, by the fixed-location accepter device, a third connection request, of the connection requests, within a second time interval when the connection profile indicator indicates a higher tolerance for delay.

7. The method of claim 1, wherein the wireless signals include one of:
    Wi-Fi signals in accordance with an Institute of Electrical and Electronics Engineers (IEEE) 802.11 standard; and
    Bluetooth signals in accordance with an IEEE 802.15 standard.

8. The method of claim 1, further comprising:
directing, by the network device and after directing the mobile accepter device, the fixed-location accepter device to accept only connection requests that have the connection profile indicator that indicates no delay tolerance; and
directing, by the network device, the mobile accepter device to accept only connection requests that do not have the connection profile indicator that indicates no delay tolerance.

9. The method of claim 1, wherein receiving the indication includes one or more of:
receiving a signal from a network monitoring device indicating an instance of inadequate network capacity in a portion of the service provider network; or
receiving a signal from the network monitoring device indicating a predicted instance of inadequate network capacity in a portion of the service provider network.

10. The method of claim 1, wherein receiving the indication includes one or more of:
receiving a signal from the fixed-location accepter device indicating an instance of inadequate capacity for the fixed-location accepter device; or
receiving a signal from the fixed-location accepter device indicating a predicted instance of inadequate capacity for the fixed-location accepter device.

11. The method of claim 1, further comprising:
receiving, by the network device and after directing the mobile accepter device, an indication of adequate capacity to accept the connection requests from the multiple MTC devices via the fixed-location accepter device; and
directing, by the network device, the mobile accepter device away from the geographic area.

12. A system comprising:
a fixed-location accepter device including:
a first local communication interface to accept connection requests, from machine-type communication (MTC) devices that are registered with a service provider network, via wireless signals, and
a first cellular communication interface to forward the connection requests to a base station via cellular broadband signals;
a mobile accepter device including:
a second local communication interface to accept the connection requests, from the MTC devices, via wireless signals, and
a second cellular communication interface to forward the connection requests to the base station via cellular broadband signals; and
a network device including a processor to:
receive registration records for the MTC devices, each of the registration records including a connection profile that indicates a level of delay tolerance for connections to the service provider network,
receive an indication of inadequate capacity to accept, by the fixed-location accepter device, the connection requests from all the MTC devices, and
direct, in response to receiving the indication, the mobile accepter device into a geographic area, wherein the mobile accepter device is configured to receive at least a portion of the connection requests, via wireless signals, with a connection profile indicator that indicates a tolerance for delay.

13. The system of claim 12, wherein the connection requests each include a connection profile indicator,
wherein the fixed-location accepter device forwards the connection requests immediately when the connection profile indicator indicates no delay tolerance, and
wherein the fixed-location accepter device forwards the connection requests within a first time interval when the connection profile indicator indicates a tolerance for delay.

14. The system of claim 12, further comprising:
another fixed-location accepter device including:
a third local communication interface to accept the connection requests, via wireless signals, and
a third cellular communication interface to forward the connection requests to the base station via cellular broadband signals,
wherein the processor of the network device is further to:
receive another indication of inadequate capacity to accept, by the fixed-location accepter device, all the connection requests from the MTC devices, and
direct, in response to receiving the other indication, the mobile accepter device into a geographic area of the fixed-location accepter device, wherein the mobile accepter device is configured to receive at least a portion of the connection requests, via wireless signals.

15. The system of claim 12, further comprising:
a core network to store the registration records and provide the network device with access to the registration records.

16. The system of claim 12, wherein the connection requests each include a connection profile indicator, and wherein the processor of the network device is further to:
direct, after receiving the indication of inadequate capacity, the fixed-location accepter device to accept only connection requests that have the connection profile indicator that indicates no delay tolerance.

17. The system of claim 12, wherein the processor of the network device is further to:
receive, after directing the mobile accepter device, an indication of adequate capacity to accept the connection requests from the MTC devices via the fixed-location accepter device, and direct, after receiving the indication of adequate capacity, the fixed-location accepter device to accept connection requests that have any connection profile indicator.

18. The system of claim 12, another mobile accepter device including:
a third local communication interface to accept the connection requests, via wireless signals, and
a third cellular communication interface to forward the connection requests to the base station via cellular broadband signals,
wherein the processor of the network device is further to:
receive another indication of inadequate capacity to accept, by the mobile accepter device, the connection requests from the MTC devices, and
direct, in response to receiving the other indication, the other mobile accepter device into a geographic area of the fixed-location accepter device, wherein the other mobile accepter device is configured to receive at least a portion of the connection requests, via the wireless signals, having the connection profile indicator that indicates a highest tolerance for delay.

19. A non-transitory computer-readable medium containing instructions executable by at least one processor, the computer-readable medium comprising one or more instructions to:

receive registration records for multiple machine-type communication (MTC) devices, each of the registration records including a connection profile that indicates a level of delay tolerance for connections, to a service provider network, by each MTC device of the multiple MTC devices;

receive, by a fixed-location accepter device and via wireless signals, connection requests from the multiple MTC devices, wherein each of the connection requests includes a connection profile indicator;

receive an indication of inadequate capacity for the fixed-location accepter device to accept all connection requests from the multiple MTC devices, wherein the fixed-location accepter device accepts the connection requests from the multiple MTC devices, and wherein each of the connection requests includes a connection profile indicator; and direct, in response to receiving the indication, a mobile accepter device into a geographic area, wherein the mobile accepter device is configured to receive at least a portion of the connection requests, via wireless signals, with the connection profile indicator indicating a tolerance for delay.

20. The non-transitory computer-readable medium claim 19, further comprising one or more instructions to:

direct, after directing the mobile accepter device, the fixed-location accepter device to accept only connection requests that have the connection profile indicator that indicates no delay tolerance; and direct, in conjunction with directing the fixed-location accepter device, the mobile accepter device to accept only connection requests that do not have the connection profile indicator that indicates no delay tolerance.

* * * * *